United States Patent
Schwerdtner

(10) Patent No.: US 7,046,272 B2
(45) Date of Patent: May 16, 2006

(54) AUTOSTEREOSCOPIC DISPLAY

(75) Inventor: Armin Schwerdtner, Dresden (DE)

(73) Assignee: Seereal Technologies GmbH, Dresden (DE)

( * ) Notice: Subject to any disclaimer, the term of this patent is extended or adjusted under 35 U.S.C. 154(b) by 0 days.

(21) Appl. No.: 10/491,366

(22) PCT Filed: Oct. 2, 2002

(86) PCT No.: PCT/DE02/03793

§ 371 (c)(1),
(2), (4) Date: Mar. 31, 2004

(87) PCT Pub. No.: WO03/032647

PCT Pub. Date: Apr. 17, 2003

(65) Prior Publication Data

US 2004/0239758 A1 Dec. 2, 2004

(30) Foreign Application Priority Data

Oct. 2, 2001 (DE) .............................. 101 49 722

(51) Int. Cl.
*H04N 7/18* (2006.01)

(52) U.S. Cl. ........................................ 348/51; 348/54

(58) Field of Classification Search ................ 348/42, 348/51, 54, 56, 59; 382/154; 352/57; 396/324; 345/6, 419

See application file for complete search history.

(56) References Cited

U.S. PATENT DOCUMENTS

| | | | | |
|---|---|---|---|---|
| 4,740,073 A | * | 4/1988 | Meacham | 352/58 |
| 5,281,960 A | * | 1/1994 | Dwyer, III | 345/31 |
| 6,791,570 B1 | * | 9/2004 | Schwerdtner et al. | 345/613 |
| 2002/0001128 A1 | * | 1/2002 | Moseley et al. | 359/465 |
| 2003/0234980 A1 | * | 12/2003 | Montgomery et al. | 359/462 |

FOREIGN PATENT DOCUMENTS

JP 07-013119 A * 1/1995

OTHER PUBLICATIONS

Murakami Hiroshi et al.; Stereoscopic Display Device; Patent Abstracts of Japan: No. 07013119 A; Jan. 17, 1995.
Katano Kouji et al.; Flat Stereoscopic Image Display Device and its Production; Patent Abstracts of Japan, No. 06046461; Feb. 18, 1994.

* cited by examiner

*Primary Examiner*—Vu Le
(74) *Attorney, Agent, or Firm*—Gudrun E. Huckett

(57) ABSTRACT

An autostereoscopic display has a flat display for representing a left stereo image and a right stereo image. It also has an image separating mask having vertical periodic structures for channeling the left and right stereo images onto a left eye and a right eye of a viewer. A device for horizontally moving the image separating mask in accordance with a position of a viewer is provided. A periodicity interval of the vertical periodic structures of the image separating mask is smaller or identical to two pixels. The device for horizontally moving the image separating mask is carries out a horizontal movement that is smaller or identical to the periodicity interval, wherein upon reaching a limit of the periodicity interval the image separating mask is returned by a length of the periodicity interval.

7 Claims, 3 Drawing Sheets

AUTOSTEREOSCOPIC DISPLAY

BACKGROUND OF THE INVENTION

The invention relates to autostereoscopic displays, comprised of a flat display for representing the two stereo images, an image separating mask with vertical periodic structures for channeling the left and right stereo images onto the left and the right eye of a viewer, and a device for horizontally moving the image separating mask in accordance with the position of the viewer.

For stereoscopic representation without auxiliary means, dual channel methods and arrangements are already known that represent the left and right stereo images on a monitor, preferably on a flat display.

With these arrangements, the two stereo images, one for the left eye and one for the right eye (referred to in the following to as left image and right image), are represented simultaneously on a flat display that is organized like a matrix in rows and columns. For channeling the left image onto the left eye and the right image onto the right eye, different masks, referred to in the following as image separating masks, are used. The best known ones employ strip-shaped barriers or lenticules.

With strip-shaped barriers as image separating masks, the left image is simply blocked from the right eye and the right image is simply blocked from the left eye. When employing lenticules, the left image is projected onto the left eye and the right image is projected onto the right eye.

Generally, the image separating masks act based on pixel columns, for example, the pixel columns having an uneven number are visible only for the left eye and the pixel columns having an even number are visible only to the right eye. The image separating masks are in general periodic arrangements of vertical strips for barriers or cylinder lenses for lenticules that are oriented in the direction of the columns of the flat display. The periodicity distance between two neighboring pixel columns is referred to as pitch.

When the viewer is positioned at the predetermined position, he can view the stereo illustration without crosstalk. When the viewer moves laterally, the left eye increasingly views portions of the right image and the right eye views portions of the left image. Arrangements with pixel column separation of the stereo images have the disadvantage that the lateral tolerance range of the viewer is very minimal for stereoscopic viewing without cross-talk. Moreover, the viewer has only a minimal tolerance range in regard to his distance from the flat display.

Since the pixels generally are composed of three color subpixels positioned adjacent to one another, the image separating masks can also be organized based on subpixels. Arrangements are known that perform channeling of the left image onto the left eye and the right image onto the right eye by image separating masks that are organized based on subpixels. The problem in this connection is that the pixel correlation can no longer be maintained. For example, the green subpixel of the uneven-numbered columns is no longer projected onto the left eye but onto the right eye.

The problem can be solved by re-coding (Stereoscopic Display Device, 1995, JP 07013119 A) or by a new design of the flat display (Flat Stereoscopic Image Display Device and its Production, 1994, JP 6046461).

Particularly advantageous is the use of lenticules as image separating masks that significantly increase the lateral tolerance range for stereoscopic viewing without cross-talk, maximally to the distance between the eyes of the viewer.

In order to further increase the tolerance range that is free of cross-talk, the image separating masks can be designed to horizontally track the position of the viewer.

Methods are known in which an image separating mask that is organized based on pixels horizontally tracks the position of the viewer. Depending on the lateral tolerance range of the viewer, the horizontal movement is several pixels wide. In general, this corresponds to several millimeters.

Disadvantageous are the high requirements posed on the mechanical parts in order to realize the tracking action of the image separating masks that are organized based on pixels or subpixels.

SUMMARY OF THE INVENTION

It is an object of the invention to shorten the range for the horizontal mechanical tracking action of the image separating masks without reducing the lateral movement tolerance range of the viewer so that the mechanical parts can be designed more simply but also more robust.

This object is solved in that the periodicity interval of the vertical periodic structures of the image separating mask is smaller or identical to two pixels and in that the horizontal movement of the image separating mask by using the periodicity of the structures of the width is smaller or identical to the periodicity interval, wherein upon reaching the periodicity limit the image separating mask is returned by a periodicity interval.

The autostereoscopic display according to the invention is characterized in particular in that the horizontal tracking action for image separating masks organized based on pixels and subpixels is limited for the lateral movement of a viewer to a range of a periodicity length of the image separating masks, wherein upon reaching the interval limit the image separating mask is returned by a periodicity interval. In this way, the required movement length of the image separating mask is significantly reduced. The mechanical part for horizontal movement of the image separating mask is simplified and can be designed to be more robust at the same time. The resulting small adjusting travel results in that even for fast movements of the viewer a tracking action of the image separating mask is possible.

Accordingly, the autostereoscopic displays according to the invention are suitable, for example, in particular in the area of medical technology, multimedia applications and engineering.

BRIEF DESCRIPTION OF THE DRAWINGS

One embodiment of the invention is illustrated in the drawings and will be explained in more detail in the following.

It is shown in.

DESCRIPTION OF PREFERRED EMBODIMENTS

An autostereoscopic display is comprised of a flat display for representing the two stereo images, an image separating mask with vertical periodic structures for channeling the left and right stereo images onto the left eye and right eye of a viewer, a device for horizontal movement of the image separating mask in accordance with the position of the viewer.

Figure 1:
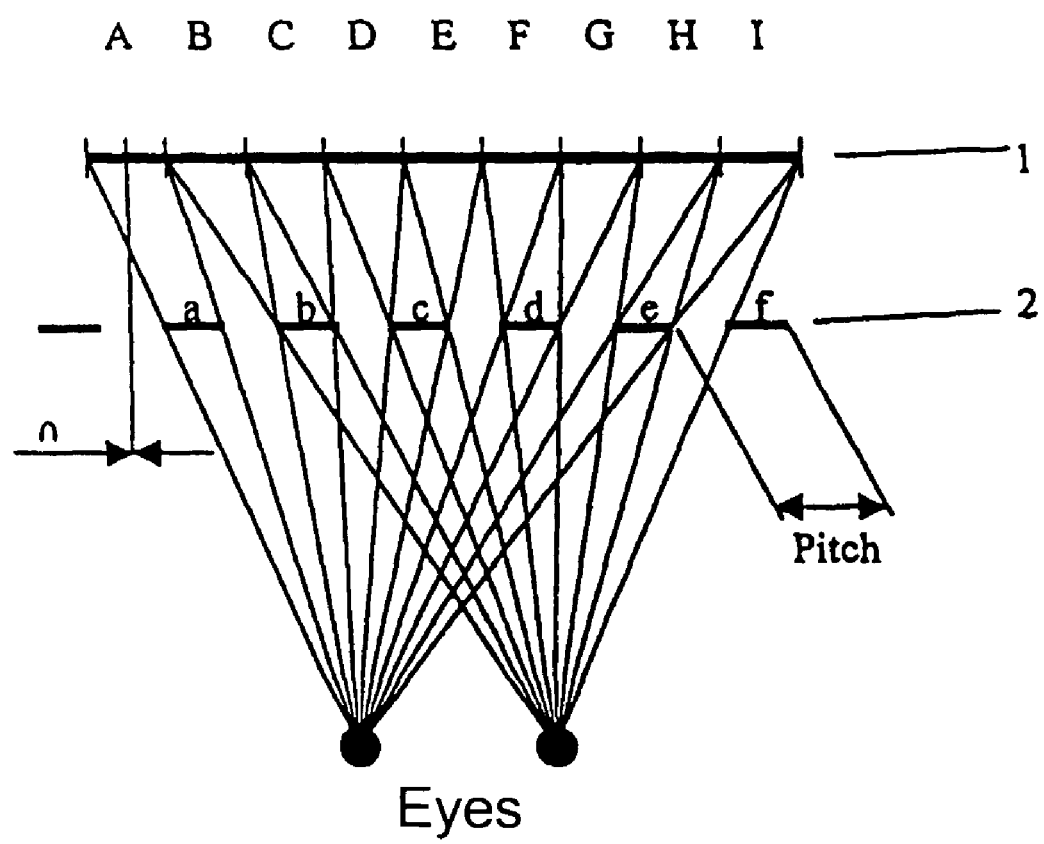
FIG. 1 a schematic illustration of a known barrier arrangement in a plan view, wherein the viewer is at the predetermined position.

In a known arrangement corresponding to the illustration of FIG. 1, the uneven numbered pixel columns A, C, E, . . . of the left stereo image and the even numbered pixel columns B, D, F, . . . of the right stereo image, written onto the flat display 1. The vertical opaque strips a, b, c, . . . on the image separating mask 2 positioned in front prevents that the left eye views portions of the right image and the right eye views portions of the left image. When the viewer is precisely positioned, there is no cross-talk.

When the viewer moves to the right, increasingly portions of the left image will become visible for the right eye and portions of the right image for the left eye. In this way, the stereo image is overlapped by pseudoscopic components whose depth ratios are reversed.

Figure 2:
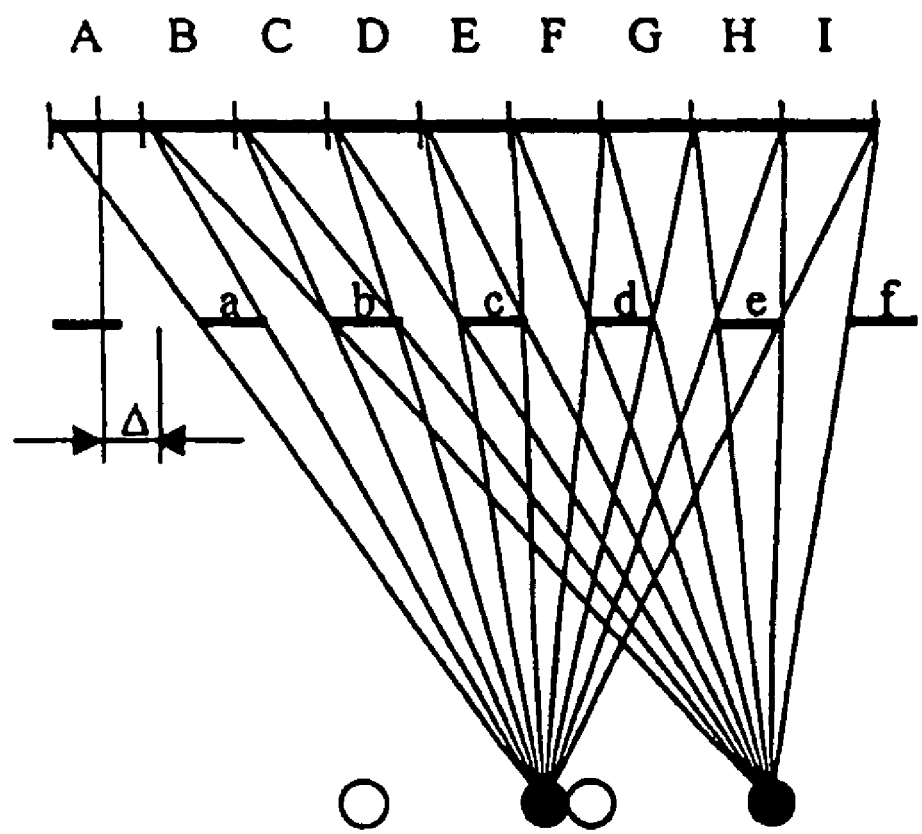
FIG. 2 a schematic illustration of the arrangement corresponding to the illustration of F*ig*. 1, wherein the viewer has moved laterally and the image separating mask has tracked the viewer.

By a known tracking action of the image separating mask 2, the cross-talk can be prevented (illustration in FIG. 2). The image separating masks 2 are generally designed such that the distance between the eyes matches a horizontal pixel distance of the flat display 1. For a lateral movement tolerance range for the viewer of approximately 50 cm, the image separating mask 2 would have to be moved by eight pixels; this corresponds in an 1841 TFT display with SXGA resolution to a range of approximately 2.25 mm. For the high precision of the positioning action of the image separating masks 2 caused thereby, this would pose significant requirements on the mechanical guide.

Figure 3:
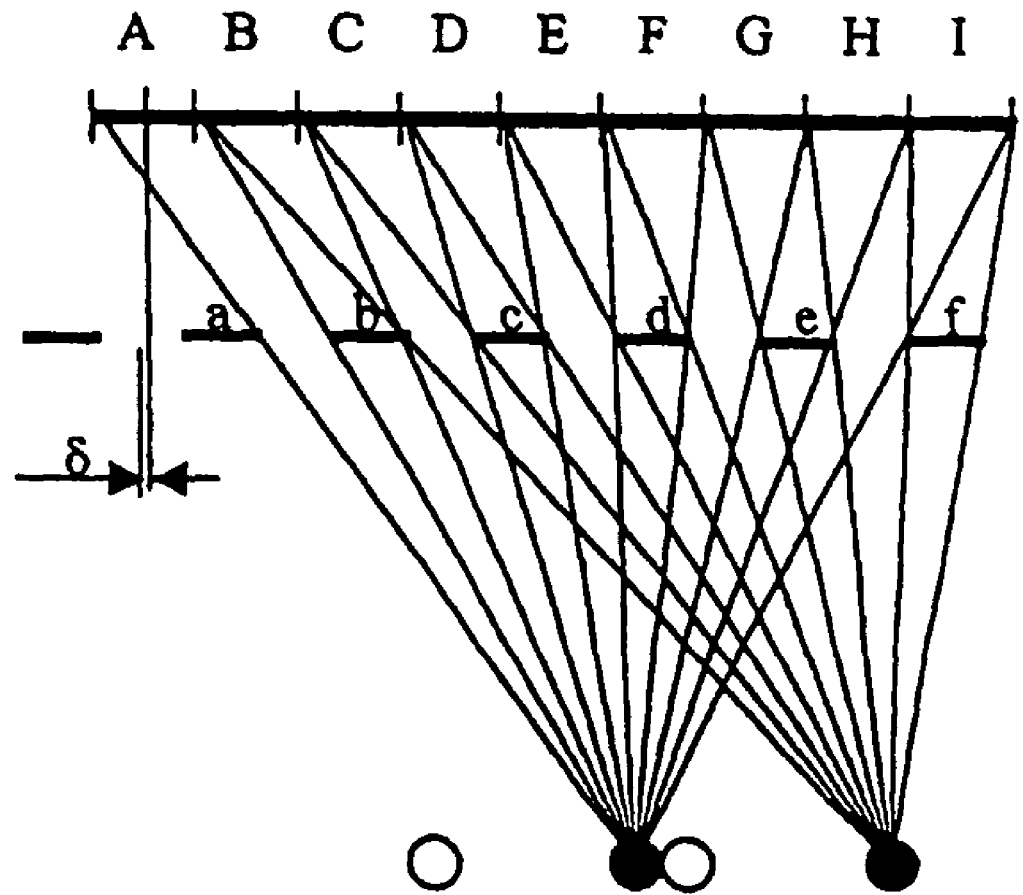
FIG. 3 a schematic illustration of an autostereoscopic display according to the invention with a reduction of the horizontal movement of the image separating mask to a periodicity length.

An autostereoscopic display according to the invention with reduced tracking is illustrated in principle in FIG. 3 wherein the range of the horizontal movement is reduced. The viewer is at the same position as illustrated in FIG. 2. By employing the periodicity of the image separating mask 1, the range for the horizontal movement of the image separating mask 2 is reduced to the width of a periodicity interval. The horizontal movement of the image separating mask 2 by employing the periodicity of the structures is limited to the width of a periodicity interval. Upon reaching the interval limit, the image separating mask 2 is returned by a periodicity interval by means of the device for horizontal movement.

For the assumed lateral movement tolerance range of the viewer of approximately 50 cm, the horizontal movement for an 18" TFT display with SXGA resolution is reduced to <0.6 mm.

Even more significant is a possible reduction of the movement of the image separating mask 2 for an image separating mask 2 that is organized based on subpixels. The pitch here has a width of <0.2 mm.

The image separating mask 2 having opaque strips is comprised of alternating transparent and opaque vertical strips whose width is uniform and not greater than a pixel width. The periodicity distance is approximately two pixels wide. For the subpixel-based control, the strips are correspondingly as wide as a subpixel and the periodicity interval is reduced generally to ⅓.

Instead of the opaque strips, in other embodiments of the image separating mask 2 prisms or lenses can be used wherein their distances, the periodicity interval, is approximately twice the pixel width or subpixel width. In the image separating masks 2 with prisms, the two prism flanks ensure that the pixel columns positioned underneath are projected alternatingly onto the left eye and onto the right eye by means of the prisms that are twice as wide. The function of a lenticular mask as an image separating mask 2 according to another embodiment is similar. In this connection, a narrow strip of alternating pixel columns or subpixel columns is projected onto the left eye or the right eye.

Devices for horizontal movement of an image separating mask 2 are known. This can be, for example, a known stepping motor whose rotational movement of the rotor is converted into translatory movement of high precision by means of a gearbox and/or an articulation and/or an eccentric coupled to the motor. The stepping motor is in principle a multi-phase electric synchronous motor that is operated by means of electronic circuits in pulse mode. Upon advancing of the control by one step, the motor carries out a rotation about a step angle. The stepping motor operates by permanent magnet excitation or is a hybrid motor. Hybrid motors are permanent magnet excited and operate according to the reluctance principle. In another embodiment, a known translatory drive can be used.

What is claimed is:

1. An autostereoscopic display comprising:
    a flat display for representing a left stereo image and a right stereo image;
    an image separating mask having vertical periodic structures for channeling the left and right stereo images onto a left eye and a right eye of a viewer;
    a device for horizontally moving the image separating mask in accordance with a position of a viewer;
    wherein a periodicity interval of the vertical periodic structures of the image separating mask is smaller or identical to two pixels;
    wherein the device for horizontally moving the image separating mask is configured to carry out a horizontal movement that is smaller or identical to the periodicity interval, wherein the image separating mask is returned by a length of the periodicity interval when a limit of the periodicity interval is reached.

2. The autostereoscopic display according to claim 1, wherein the image separating mask comprises opaque strip-shaped areas as a barrier.

3. The autostereoscopic display according to claim 1, wherein the image separating mask is comprised of strip-shaped prisms.

4. The autostereoscopic display according to claim 1, wherein the image separating mask is a lenticule with cylinder lenses.

5. The autostereoscopic display according to claim 1, wherein the image separating mask is organized based on pixel columns.

6. The autostereoscopic display according to claim 1, wherein the image separating mask is organized based on subpixels.

7. An autostereoscopic display comprising:
    a flat display for representing a left stereo image and a right stereo image;
    an image separating mask having vertical periodic structures for channeling the left and right stereo images onto a left eye and a right eye of a viewer;
    a device for horizontally moving the image separating mask in accordance with a position of a viewer;
    wherein a periodicity interval of the vertical periodic structures of the image separating mask is smaller or identical to two pixels;

wherein the device for horizontally moving the image separating mask tracks a lateral movement of an observer by carrying out a horizontal movement that is smaller or identical to the periodicity interval, wherein the image separating mask carries out a return movement matching a length of the periodicity interval when a limit of the periodicity interval is reached, and repeats said horizontal movement and said return movement as needed for tracking the lateral movement.

* * * * *